(12) United States Patent
Wang

(10) Patent No.: US 6,404,943 B1
(45) Date of Patent: Jun. 11, 2002

(54) APPARATUS AND METHOD FOR DIRECTING OPTICAL SIGNALS USING A MOVABLE OPTICAL SWITCHING ELEMENT

(75) Inventor: Shih-Yuan Wang, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/415,312

(22) Filed: Oct. 8, 1999

(51) Int. Cl.[7] .................................................. G02B 6/26
(52) U.S. Cl. ........................................................ 385/22
(58) Field of Search ........................ 385/16–24, 122–127, 385/147

(56) References Cited

U.S. PATENT DOCUMENTS 5,699,462 A * 12/1997 Fouquet et al. ............... 385/18
6,005,993 A * 12/1999 MacDonald .................. 385/16
6,091,867 A *  7/2000 Young et al. ................. 385/17
6,148,124 A * 11/2000 Aksyuk et al. ............... 385/24
6,236,481 B1 *  5/2001 Laor .......................... 359/124

* cited by examiner

Primary Examiner—Akm E. Ullah

(57) ABSTRACT

An improved optical switch includes a movable optical switching element configured to selectively direct optical signals traveling in an optical input path to one of at least two optical output paths. The movable optical switching element may include waveguide portions and/or mirrors to direct the optical signals. In an alternative embodiment, the moveable optical switching element may include waveguide grating couplers to allow the selective reflection of a particular wavelength of light from an optical waveguide carrying a number of such of optical wavelengths.

14 Claims, 8 Drawing Sheets

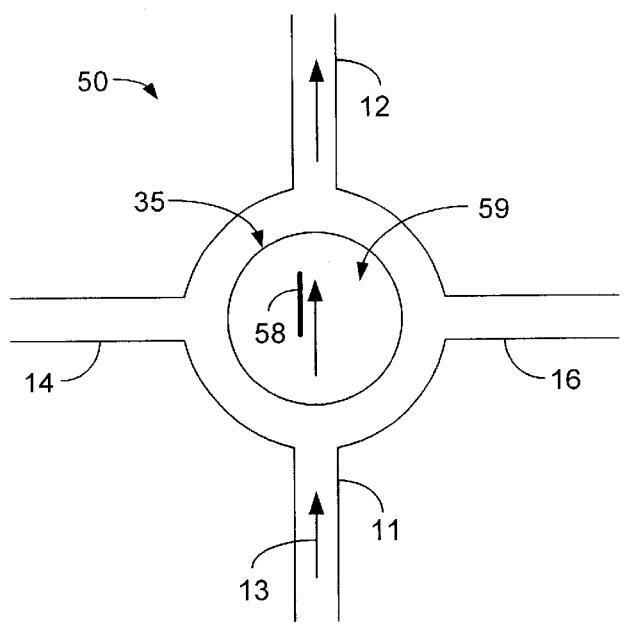
Fig. 4A
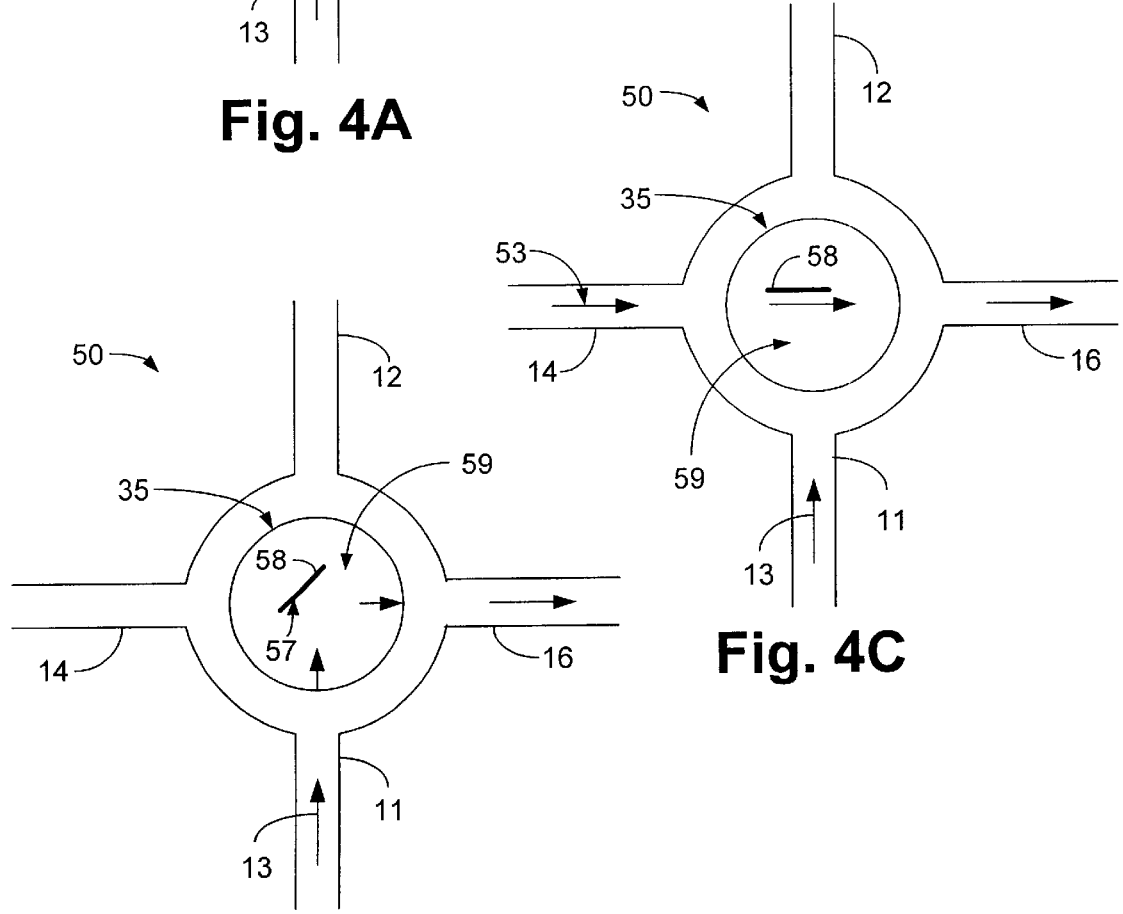
Fig. 4B
Fig. 4C

APPARATUS AND METHOD FOR DIRECTING OPTICAL SIGNALS USING A MOVABLE OPTICAL SWITCHING ELEMENT

TECHNICAL FIELD

The present invention relates generally to optical switches, and, more particularly, to an apparatus and method for directing optical signals using a movable optical switching element.

BACKGROUND OF THE INVENTION

Communication technology has progressed significantly in the past few years. Today, much information is carried over optical communications fiber. This fiber optic technology allows the transport of information at data rates currently exceeding millions of bits of information per second. Part of the technology that enables this optical communication is the ability to direct light onto an optical fiber and switch that light appropriately. Typically, a number of optical fibers are combined into a fiber optic cable. When a fiber optic cable is carrying many individual signals over large distances, it is necessary to have the ability to switch those signals onto other fiber optic cables. A mesh of fiber optic cable infrastructure spans the world. At certain places in the mesh it is desirable to have the ability to switch the light signals from one fiber optic cable to another. A typical fiber optic cable may be comprised of a plurality of individual optical fibers bound together, for example, in a ribbon arrangement. A typical fiber optic ribbon cable may contain 32 individual optical fibers. Each optical fiber is capable of carrying one signal, or in the case of dense wave division multiplexing (DWDM), in which many signals may be multiplexed onto a single optical fiber through the use of multiple colors of light, each optical fiber may carry a plurality of light colors (wavelengths), with each color representing a single signal.

Optical switches capable of routing light from one direction to another have been known for some time. One type of optical switch element is disclosed in commonly assigned U.S. Pat. No. 5,699,462 to Fouquet et al., in which an optical switch element is located at an intersection of two optical waveguides. Depending on the state of a material within the optical switch element, light is either transmitted through the switch element continuing axially on the original waveguide, or reflected by the switch element onto a waveguide that intersects the original waveguide. The switch element is filled with a material that, while in a transmissive state, has an index of refraction substantially equal to that of the waveguide, thus allowing light in the waveguide to pass through the switch element. The state of the material within the switch element may be changed, through the operation of heaters within the switch element, so as to vaporize the liquid in the switch element to form a bubble. While present in the switch element the bubble causes a refractive index mismatch between the waveguide and the switch element, thus causing the light in the waveguide to be reflected onto the intersecting waveguide. This state is known as the reflective state. The operation of a preferred and many alternative embodiments of this switch element is set forth in detail in the above-identified commonly assigned U.S. Patent to Fouquet et al.

When placed at an intersection of two waveguide segments, one of the above-mentioned optical switch elements forms an optical switch point, which may be used to switch signals on a plurality of optical fibers. The optical switch points may be further arranged so as to form a switching matrix. For example, when arranged in a 32×32 matrix, formed by 32 rows and 32 columns of optical switch points, a 32 fiber optic ribbon cable can be connected to 32 input lines and another 32 fiber optic ribbon cable can be connected to 32 output lines, the output lines intersecting the 32 input lines. Because a switch element is located at each optical switch point it is possible to switch any of the 32 input lines to any of the 32 output lines. In this manner, optical signals may be directed from one fiber optic cable onto another, resulting in a compact optical switch.

Although the above-described switch element is useful in many applications, there may be situations in which the use of an optical switch that does not use fluid, and that does not require a heater to form a bubble in the fluid, may be desirable.

Therefore, an alternative manner for switching light in an optical fiber switch matrix would be desirable.

SUMMARY OF THE INVENTION

The invention provides an apparatus and method for directing optical signals using a movable optical switching element.

In architecture, the present invention may be conceptualized as an apparatus for directing optical signals. The apparatus comprises an optical input path; and a movable optical switching element aligned with the optical input path. The movable optical switching element is configured to selectively direct the optical signal from the optical input path to one of at least two optical output paths.

The present invention may also be conceptualized as a method for selectively directing optical signals. The method comprises the following steps: providing an optical input path; providing a moveable optical switching element; directing the optical signal from the optical input path to the movable optical switching element disposed in the optical input path; and using the movable optical switching element to selectively direct the optical signal to one of at least two optical output paths.

The invention has numerous advantages, a few of which are delineated, hereafter, as merely examples.

An advantage of the invention is that it allows a plurality of optical signals to be switched simultaneously.

Another advantage of the invention is that it allows a single optical signal to be extracted from an optical fiber carrying a plurality of optical signals.

Another advantage of the invention is that it can be structured not to require constant power to maintain a switched state.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIGS. 4A–4C are plan views illustrating a third embodiment of the optical switch point including a third embodiment of a moveable optical switching element in accordance with the invention;

DETAILED DESCRIPTION OF THE INVENTION

Figure 1A:
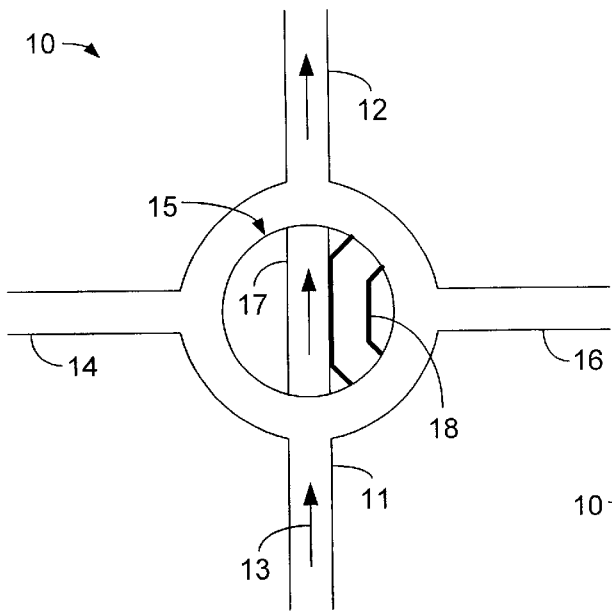
FIGS. 1A–1C are plan views illustrating a first embodiment of the invention.
Figure 1C:
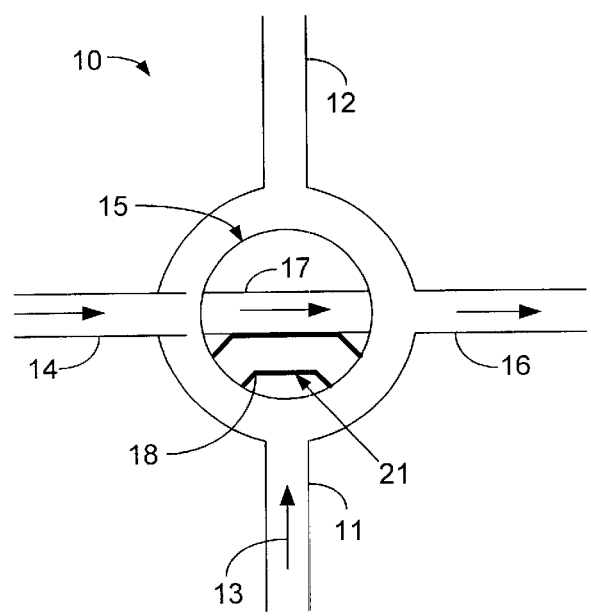
Figure 1B:
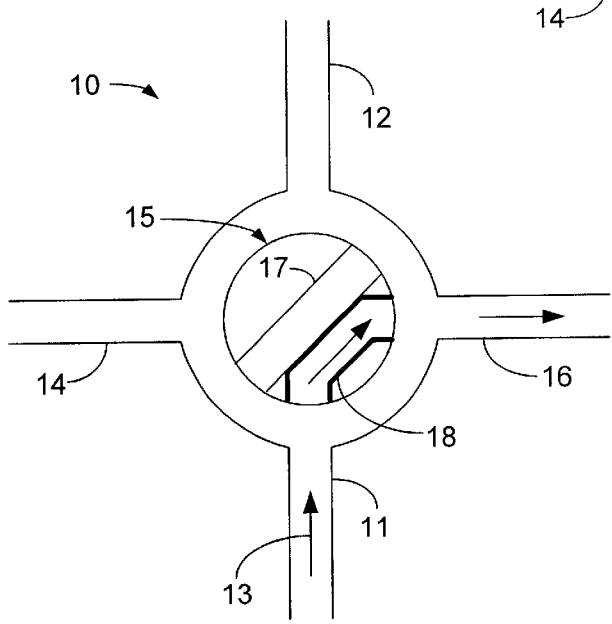

Turning now to the drawings, FIGS. 1A–1C are plan views illustrating a first embodiment of the invention. As shown in FIG. 1A, optical switch point 10 includes waveguide portion 11 and waveguide portion 12. Situated at the optical switch point 10 is moveable optical switching element 15. Moveable optical switching element 15 includes waveguide portion 17 and waveguide portion 18. As illustrated in FIG. 1A, waveguide portion 17 is aligned with waveguide portion 11 and waveguide portion 12, resulting in the transmission of an optical signal, designated by arrow 13, directly through optical switch point 10. Optical switch point 10 also includes waveguide portion 14 and waveguide portion 16, which are situated substantially perpendicular to waveguide portion 11 and waveguide portion 12.

FIG. 1B illustrates the optical switch point 10 in which the moveable optical switching element 15 has been rotated through approximately 45 degrees, resulting in one end of waveguide portion 18 being disposed to receive the optical signal represented by arrow 13 from waveguide portion 11. The optical signal traveling in waveguide portion 11 enters waveguide portion 18 and is directed therethrough into waveguide portion 16. As shown in FIG. 1B, the optical signal 13 traveling in waveguide portion 11 is efficiently and effectively switched through a direction change of approximately 90 degrees into waveguide portion 16. In this manner, the moveable optical switching element 15 allows the selective switching of optical signals.

FIG. 1C illustrates optical switch point 10 in which the moveable optical switching element 15 has been rotated through an additional 45 degrees, or a total of approximately 90 degrees with respect to its position shown in FIG. 1A. In the position illustrated in FIG. 1C, optical switch point 10 allows the transmission of light from waveguide portion 14 through the waveguide portion 17 of moveable waveguide 15 and out through waveguide portion 16. With respect to an optical signal traveling in waveguide portion 11, the light of the optical signal meets a non-waveguide portion 21 of moveable optical switching element 15, resulting in the termination of the optical signal 13 traveling in waveguide portion 11. An optical signal traveling in waveguide portion 14 may be selectively directed to waveguide portions 16 or 11, depending upon the position of moveable optical switching element 15. Indeed, the moveable optical switching element 15 may be rotated into any position resulting in the capability of routing an optical signal in any waveguide either through the waveguide portion aligned therewith, or toward the waveguide portion offset 90 degrees therefrom. Furthermore, while illustrated at right angles, waveguide portions 11, 12, 14 and 16 may be fabricated at other than right angles to each other, as will be described below with respect to FIGS. 6A, 6B, 7A and 7B.

Figure 2A:
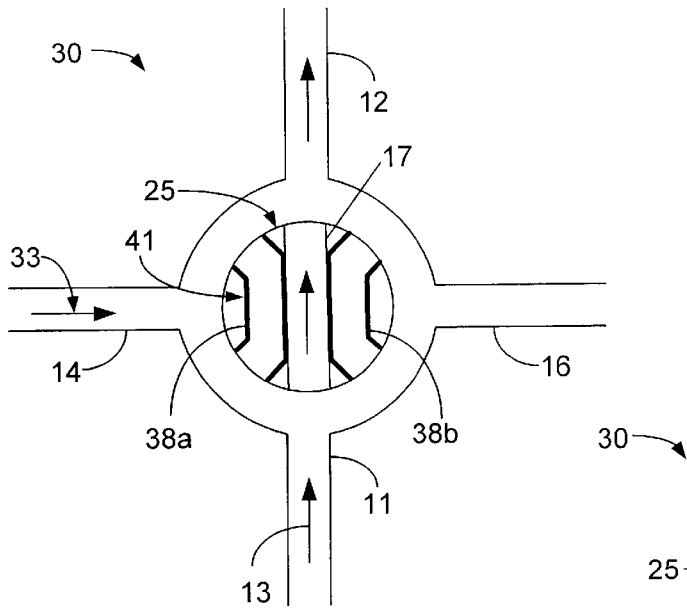
FIGS. 2A–2C are plan views illustrating a second embodiment of the optical switch point including a second embodiment of the moveable optical switching element of the invention.
Figure 2C:
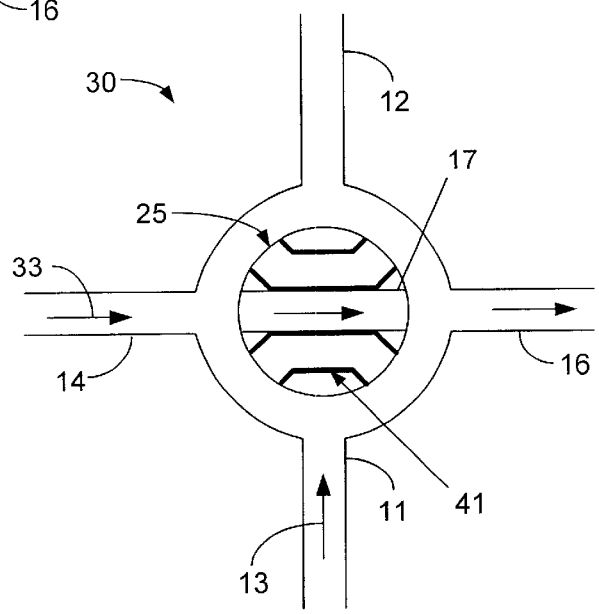
Figure 2B:
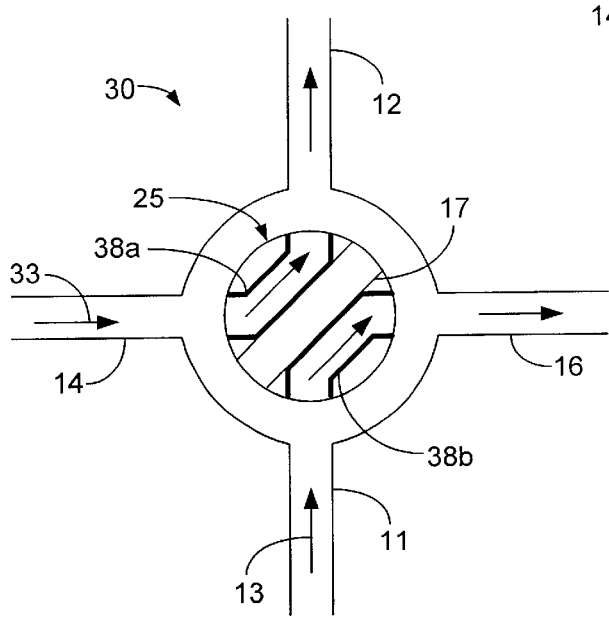

FIGS. 2A–2C are plan views illustrating a second embodiment 30 of the optical switch point including a second embodiment 25 of the moveable optical switching element of the invention.

Optical switch point 30 includes waveguide portions 11, 12, 14 and 16, which are identical to those described with respect to FIG. 1. Indeed, the like-numbered elements shown in FIGS. 2A–2C that correspond to those described in FIGS. 1A–1C are identical thereto and will not be described again. Optical switch point 30 also includes moveable optical switching element 25, which includes waveguide portion 17, and waveguide portions 38a and 38b. Waveguide portions 38a and 38b of FIG. 2A are similar to waveguide portion 18 of FIG. 1A. However, in a departure from that shown with respect to FIG. 1A, two waveguide portions 38a and 38b are illustrated in FIG. 2A.

As illustrated in FIG. 2A, an optical signal represented by arrow 13 traveling in waveguide portion 11 is directed into and through waveguide portion 17 of moveable optical switching element 25 and then directed into waveguide portion 12. The optical signal 33 traveling in waveguide 14 meets non-waveguide portion 41 of moveable optical switching element 25 and is terminated.

FIG. 2B illustrates optical switch point 30 in which the moveable optical switching element 25 has been rotated through approximately 45 degrees. As shown, an optical signal, represented by arrow 13, traveling in wave guide portion 11 enters waveguide portion 38b of moveable optical switching element 25 and is directed into waveguide portion 16. Concurrently therewith, an optical signal, represented by arrow 33, traveling in waveguide 14 is directed into waveguide portion 38a of moveable optical switching element 25 and is directed into waveguide portion 12. In this manner, the direction of two optical signals can be simultaneously switched using the optical switch point 30.

FIG. 2C illustrates optical switch point 30 in which the moveable optical switching element 25 has been rotated through an additional 45 degrees to a position that is approximately 90 degrees offset from that shown in FIG. 2A. An optical signal represented by arrow 33 traveling in waveguide portion 14 enters waveguide portion 17 of moveable optical switching element 25 and is directed to waveguide portion 16. An optical signal 13 traveling in waveguide portion 11 meets non-waveguide portion 41 of moveable optical switching element 25 and is terminated.

Figure 3:
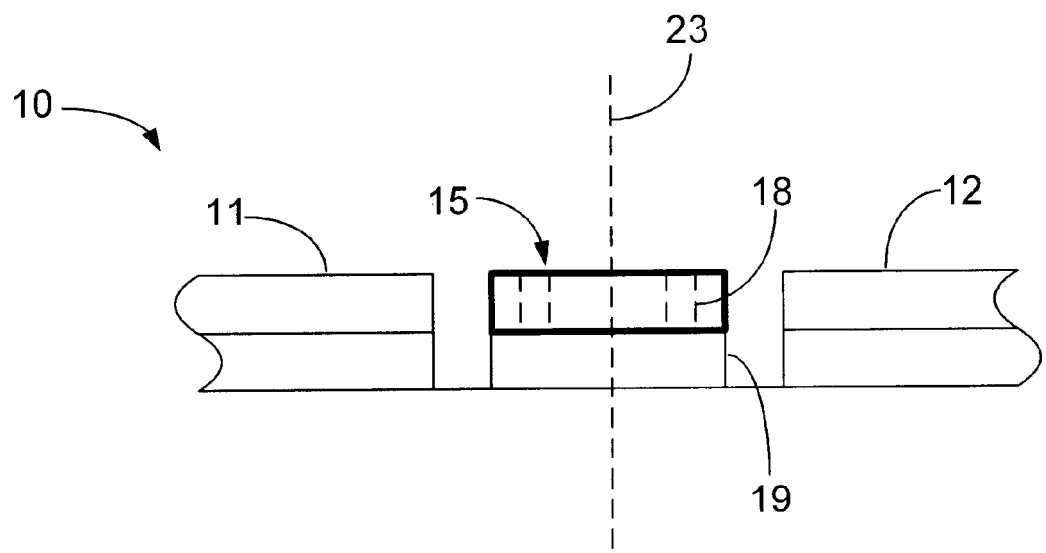
FIG. 3 is a cross-sectional schematic view illustrating the optical switch point of FIG. 1A.

FIG. 3 is a cross-sectional schematic view illustrating the optical switch point 10 of FIG. 1A. FIG. 3 illustrates in detail waveguide portion 11, waveguide portion 12 and movable optical switching element 15. Moveable optical switching element 15 is part of turntable 19. Turntable 19 is illustrated as a platform that rotates about an axis 23 that is perpendicular to waveguide portions 11 and 12. However, turntable 19 may be any means for rotating moveable optical switching element 15. For example, turntable 19 may be part of a micro-machined motor assembly, which provides the rotational force for moveable optical switching element 15. Also shown in FIG. 3 as dotted lines is waveguide portion 18 of moveable optical switching element 15. The above-described micro-machined motor over which turntable 19 may reside may be constructed using optical micro electromechanical systems (MEMS) technology. Further details of MEMS and optical MEMS technology can be found at the Sandia National Foundry for MEMS technology and which has an Internet website located at: http://www.mdl.sandia.gov/scripts/index.asp.

The description of a rotary motor can be found at this web site and is a common device used in optical MEMS technology.

Furthermore, co-pending, commonly assigned U.S. patent application Ser. No. 08/818,209, entitled ELECTROSTATIC ACTUATOR WITH SPATIALLY ALTERNATING VOLTAGE PATTERNS, and filed on Mar. 14, 1997, describes an electrostatic motor that may be used to provide the above-described rotational motion, and the translational motion to be described below, for turntable 19, and is hereby incorporated into this document by reference.

Additional layers, which constitute the optical waveguides of the invention can be fabricated over all or a portion of the motor assembly. Similarly, a mirror (to be described below) may be fabricated over all or a portion of the motor assembly. The optical waveguides typically consists of a guiding layer, also known as a "core", surrounded by cladding. The core typically has an optical refractive index higher than the optical refractive index of the surrounding cladding. The optical waveguides can be fabricated with polymer based material, or spin-on glass that is compatible with post processing of the optical MEMS devices.

For example, a technique known as "self-assembly" can be used to fabricate the optical waveguides or the mirror on a turntable formed on a surface of the above-described rotary motor. Using this technique, the optical waveguides or mirror can be fabricated with "mating slots", which correspond to mating slots formed on the surface of the rotary motor. These mating slots simplify assembly of the optical waveguide or mirror to the surface of the rotary motor. An example of this technology can be found on the Internet at http://www.alientechnology.com/, where a technique that is used to assemble liquid crystal displays is described.

FIGS. 4A–4C are plan views illustrating a third embodiment 50 of the optical switch point including a third embodiment 35 of a moveable optical switching element in accordance with the invention.

The optical switch point 50 of FIG. 4A is similar to that shown with respect to FIG. 1A and FIG. 2A with the difference being that moveable optical switching element 35 includes mirror 58 instead of any waveguide portions. Mirror 58 resides in free space region 59. This means that an optical signal 13 traveling through waveguide portion 11 travels through free space region 59 into waveguide portion 12. Note that mirror 58 is offset from the center of moveable optical switching element 35 to facilitate the transmission of an optical signal when the moveable optical switching element 35 is positioned as shown in FIG. 4A.

FIG. 4B illustrates the optical switch point 50 in which the moveable optical switching element 35 has been rotated through approximately 45 degrees so that a surface 57 of mirror 58 is in the path of an optical signal traveling in waveguide portion 11. As illustrated, an optical signal traveling in waveguide portion 11 is directed onto surface 57 of mirror 58, which reflects the optical signal into waveguide portion 16. In this manner, an optical signal traveling in waveguide portion 11 is selectively deflected, or switched, into waveguide portion 16.

FIG. 4C illustrates the optical switch point 50 in which the moveable optical switching element 35 has been rotated through an additional 45 degrees to a position that is approximately 90 degrees offset from that shown in FIG. 4A. An optical signal 53 traveling in waveguide portion 14 passes through free space region 59 and into waveguide portion 16. As illustrated, because mirror 58 is offset from the center of moveable optical switching element 35, the free space transmission of an optical signal traveling in waveguide 14 is permitted.

In the embodiment illustrated in FIG. 4C, the signal 13 in waveguide 11 would meet mirror 58 and be reflected back into the waveguide 11, possibly causing instability in the optical signals traversing the optical switch point 50. Instead of being perpendicular to waveguide portion 11, mirror 58 can be positioned at a small angle with respect to waveguide portion 11. In this manner, signal 13 could be prevented from being reflected back into waveguide portion 11. Alternatively, a light absorber (not shown) may be added adjacent to waveguide portion 11 to capture the portion of signal 13 reflected back into waveguide portion 11.

In an alternative embodiment, the surface of the mirror 58 can be curved such that it collects the light exiting waveguide 11 into free space region 59 and focuses it onto waveguide 16 as in FIG. 4B. One example would be for the mirror to be a part of an ellipsoidal surface such that the exit of one waveguide and the entrance of the second waveguide (or optical fibers) are located at the foci of the ellipsoidal mirror.

Figure 5:
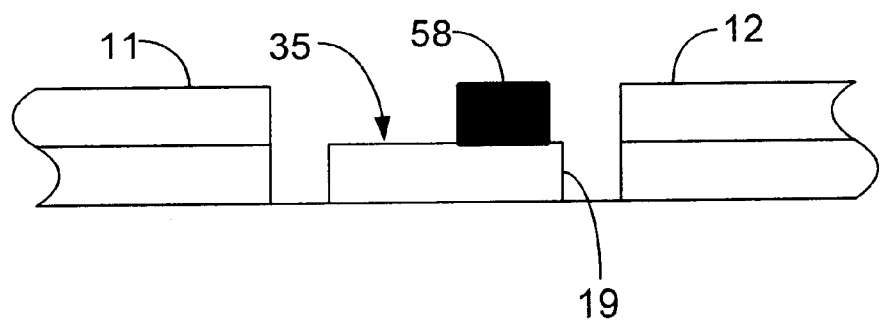
FIG. 5 is a cross-sectional schematic view illustrating the optical switch point of FIGS. 4A–4C.

FIG. 5 is a cross-sectional schematic view illustrating the optical switch point 50 of FIGS. 4A–4C. In the optical switch point 50 of FIG. 5, mirror 58 resides on turntable 19. Irrespective of the manner in which turntable 19 is actuated, mirror 58 rotates with turntable 19 to provide the optical switching capability referred to above with respect to FIGS. 4A–4C.

Figure 6A:
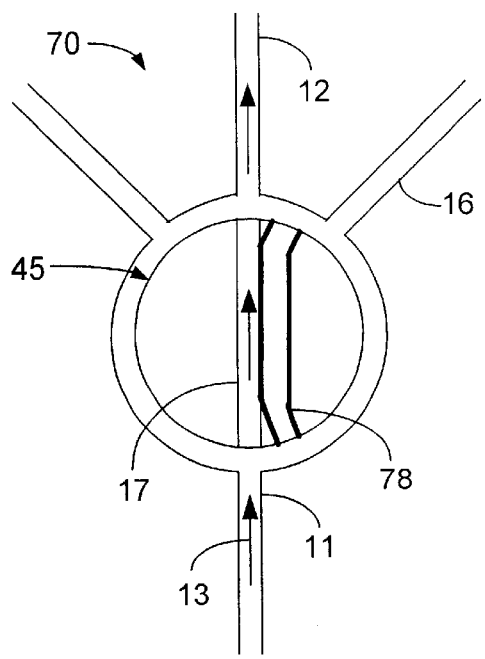
FIGS. 6A and 6B are plan views illustrating a fourth embodiment of the optical switch point including a fourth embodiment of a moveable optical switching element of the invention.
Figure 6B:
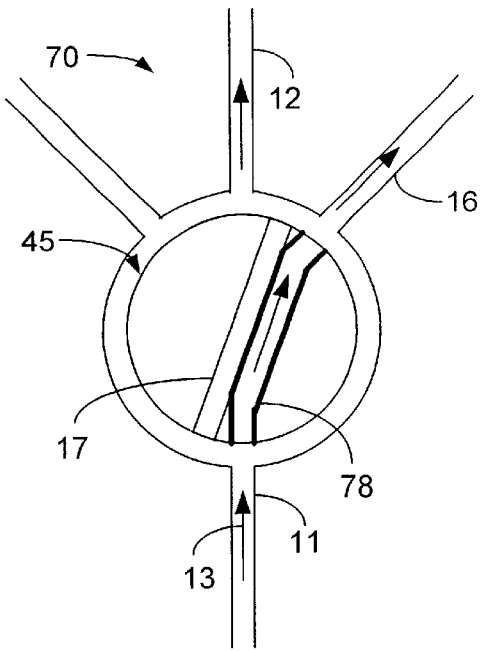

FIGS. 6A and 6B are plan views illustrating a fourth embodiment 70 of the optical switch point including a fourth embodiment 45 of a moveable optical switching element of the invention.

Optical switch point 70 includes waveguide portions 11, 12, and 16. However, in a departure from that described above, waveguide portion 16 is not substantially perpendicular to waveguide portions 11 and 12. This illustrates a feature of the invention in which the moveable optical switching element 45 includes waveguide portion 78, which is configured to redirect an optical signal between waveguides that are not perpendicular to each other. Moveable optical switching element 45 also includes waveguide portion 17, which, as shown in FIG. 6A, is configured to direct an optical signal traveling in waveguide portion 11 to waveguide portion 12.

FIG. 6B illustrates the optical switch point 70 in which the moveable optical switching element 45 has been rotated through an angle such that waveguide portion 78 is in the path of an optical signal 13 traveling in waveguide portion 11. Waveguide portion 78 then directs the optical signal 13 received from waveguide portion 11 to waveguide portion 16. As mentioned above, waveguide portion 16 is disposed at an angle other than 90 degrees with respect to waveguide portion 11. Although shown as greater than 90 degrees, waveguide portion 16 may also be disposed at an angle of less than 90 degrees with respect to waveguide portion 11. In this manner, light may be selectively directed from waveguide portion 11 into waveguide portion 16.

Figure 7A:
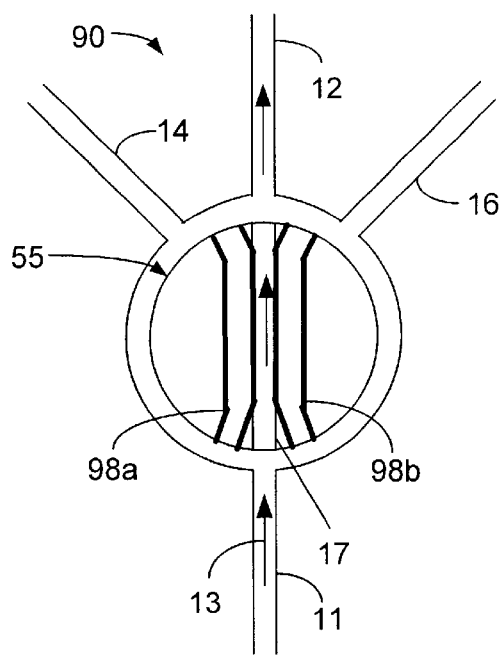
FIGS. 7A and 7B are plan views illustrating an alternative embodiment of the optical switch point of FIGS. 6A and 6B including a fifth embodiment of a moveable optical switching element of the invention.
Figure 7B:
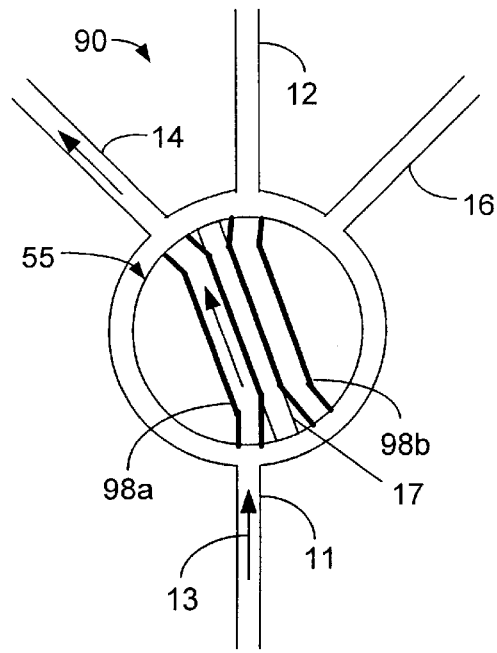

FIGS. 7A and 7B are plan views illustrating an alternative embodiment 90 of the optical switch point of FIGS. 6A and 6B and includes a fifth embodiment 55 of a moveable optical switching element of the invention. Moveable optical switching element 55 includes waveguide portions 17, and 98a and 98b. Waveguide portion 17 is configured to direct an optical signal 13 traveling in waveguide portion 11 to waveguide portion 12. Waveguide portion 98b corresponds to waveguide portion 78 of FIG. 6A. Moveable optical switching element 55 also includes waveguide portion 98a.

FIG. 7B illustrates optical switch point 90 in which the moveable optical switching element 55 is rotated in a direction opposite that described above with respect to FIG. 6B, so that waveguide portion 98a receives an optical signal 13 traveling in waveguide portion 11. Waveguide portion 98a then directs this optical signal 13 into waveguide portion 14. As is evident with respect to FIG. 7B, moveable optical switching element 55, and indeed all of the above described embodiments of the moveable optical switching element, are able to rotate in either direction, thus allowing a number of different optical signal switching options.

Figure 8A:
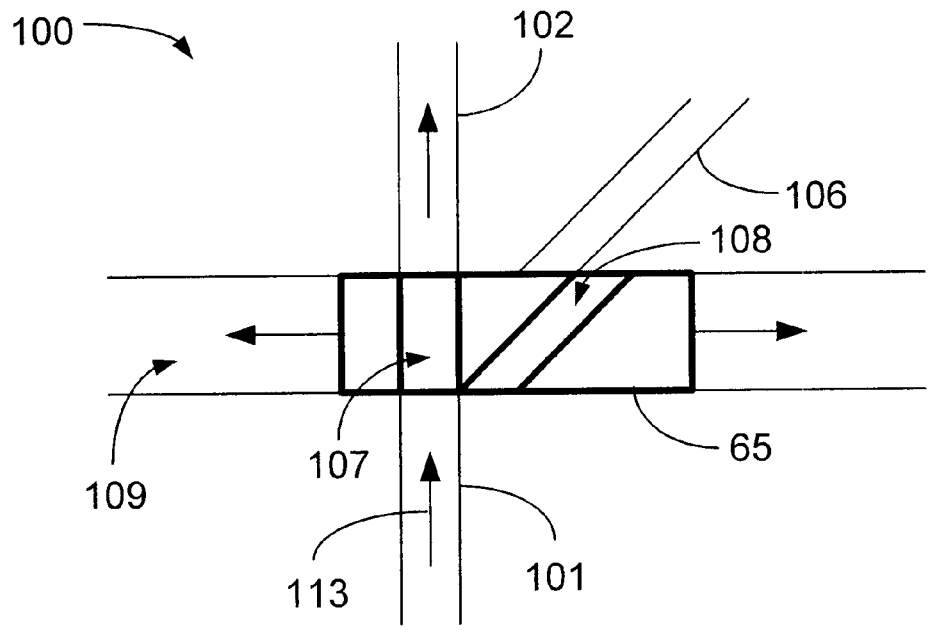
FIGS. 8A and 8B are plan views illustrating yet another embodiment of an optical switch point including a sixth embodiment of a moveable optical switching element of the invention.
Figure 8B:
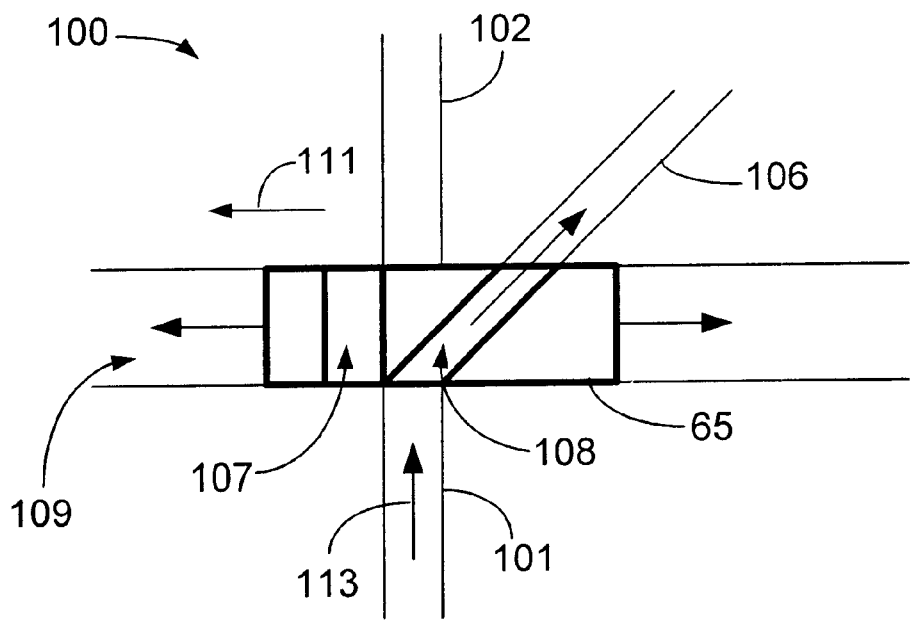

FIGS. 8A and 8B are plan views illustrating yet another embodiment 100 of an optical switch point including a sixth embodiment 65 of a moveable optical switching element of the invention. Optical switch point 100 includes waveguide portions 101, 102 and 106. In this embodiment, moveable optical switching element 65 slides, or otherwise translates, within channel 109. Moveable optical switching element 65 includes waveguide portion 107 and waveguide portion 108. As illustrated in FIG. 8A, an optical signal, represented by arrow 113 is directed through waveguide portion 101 into waveguide portion 107 of moveable optical switching element 65. The optical signal 113 is then directed through waveguide portion 107 into waveguide portion 102.

FIG. 8B illustrates the optical switch point 100 in which the moveable optical switching element 65 has translated in a direction indicated by arrow 111 such that waveguide portion 108 of moveable optical switching element 65 is in position to receive an optical signal represented by arrow 113 traveling in waveguide portion 101. The optical signal 113 is then directed through waveguide portion 108 and into waveguide portion 106. In this manner, an optical signal may be selectively redirected from waveguide portion 101 into waveguide portion 106. Although illustrated as having only two waveguide portions, moveable optical switching element 65 may have more than two waveguide portions. Also, moveable optical switching element 65 may slide in the direction opposite that indicated by arrow 111 depending upon the desired application.

Figure 9:
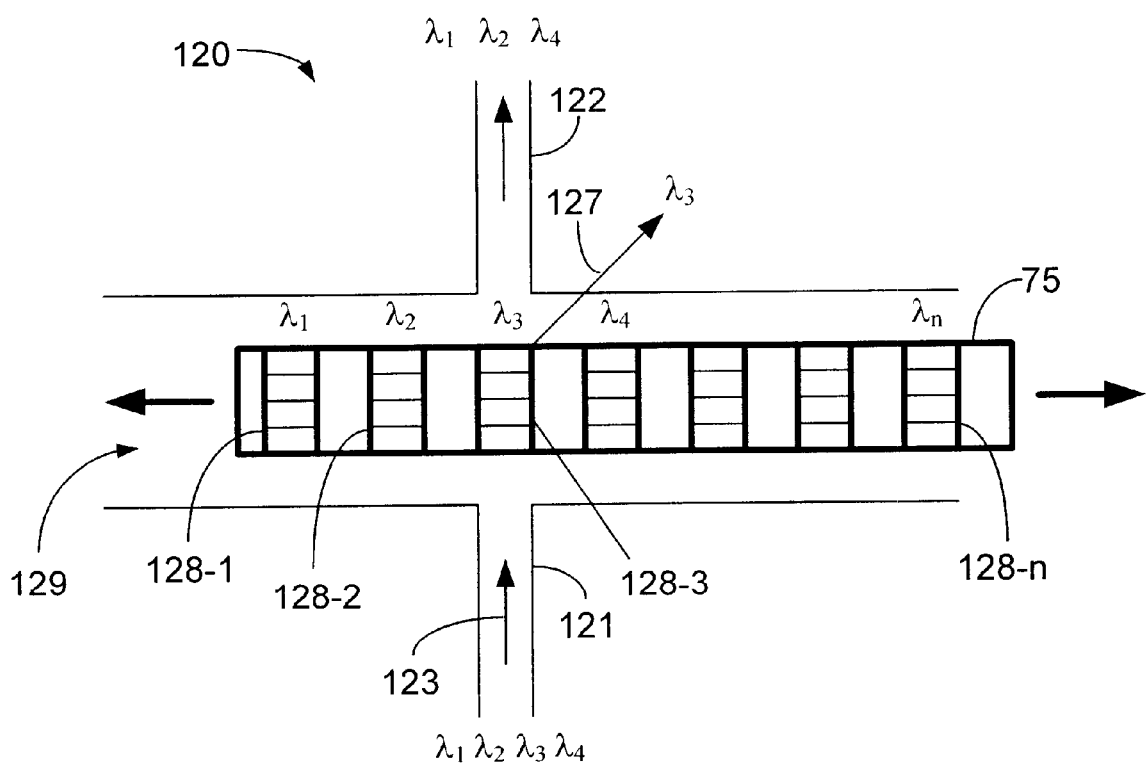
FIG. 9 is a plan view illustrating an alternative embodiment of the optical switch point of FIGS. 8A and 8b including a seventh embodiment of a moveable optical switching element in accordance with the invention.

FIG. 9 is a plan view illustrating an alternative embodiment 120 of the optical switch point 100 of FIGS. 8A and 8b including a seventh embodiment 75 of a moveable optical switching element in accordance with the invention. Optical switch point 120 includes waveguide portion 121, waveguide portion 122 and moveable optical switching element 75. In this embodiment, moveable optical switching element 75 translates within channel 129. Moveable optical switching element 75 also includes a plurality of waveguide grating couplers 128-1 through 128-n. Waveguide grating couplers 128 are each configured to reflect light of a particular optical frequency. To illustrate, assume that an optical signal represented by arrow 123 traveling in waveguide portion 121 includes four optical frequencies, represented by the symbols $\lambda_1$, $\lambda_2$, $\lambda_3$, and $\lambda_4$.

In the configuration shown in FIG. 9, the optical signal including the four wavelengths is directed through waveguide portion 121 onto moveable optical switching element 75. Moveable optical switching element 75 is translated in channel 129 so that the optical signal in waveguide portion 123 is directed onto waveguide grating coupler 128-3. Waveguide grating coupler 128-3 is configured to allow the passage of all optical frequencies, or a portion of optical frequencies, except for frequency $\lambda_3$ of the optical signal traveling in waveguide portion 121. Waveguide grating coupler 128-3 filters the frequency represented by $\lambda_3$, and transmits the optical signal including the remaining frequencies $\lambda_1$, $\lambda_2$ and $\lambda_4$ into waveguide portion 122. The portion of the optical signal, which includes frequency $\lambda_3$ is depicted by arrow 127 as being picked off of the optical signal and redirected to another waveguide through evanescent coupling. Alternatively, the signal can be collected by a lens system and refocused into an optical fiber or waveguide for further processing or transmission. Evanescent coupling refers to coupling between two waveguides when the optical field in a first waveguide overlaps into a second waveguide, where over a characteristic length called the coupling length, a portion of the optical power in the first waveguide transfers to the second waveguide. Evanescent coupling is known to those skilled in the art. The portion of the optical signal that contains the frequency represented by $\lambda_3$ can be reflected in a direction perpendicular to, or nearly perpendicular to, the plane of moveable optical switching element 75, as shown in FIG. 10, which will be described below.

The reflected light can terminate on a photodiode and be converted from an optical signal to an electrical signal for further processing or transmission of information. In this manner, a moveable optical switching element 75 including a plurality of waveguide grating couplers can be used to separate frequencies in an optical signal, such as in systems that use wavelength division multiplexing (WDM) and dense wavelength multiplexing (DWDM).

Figure 10:
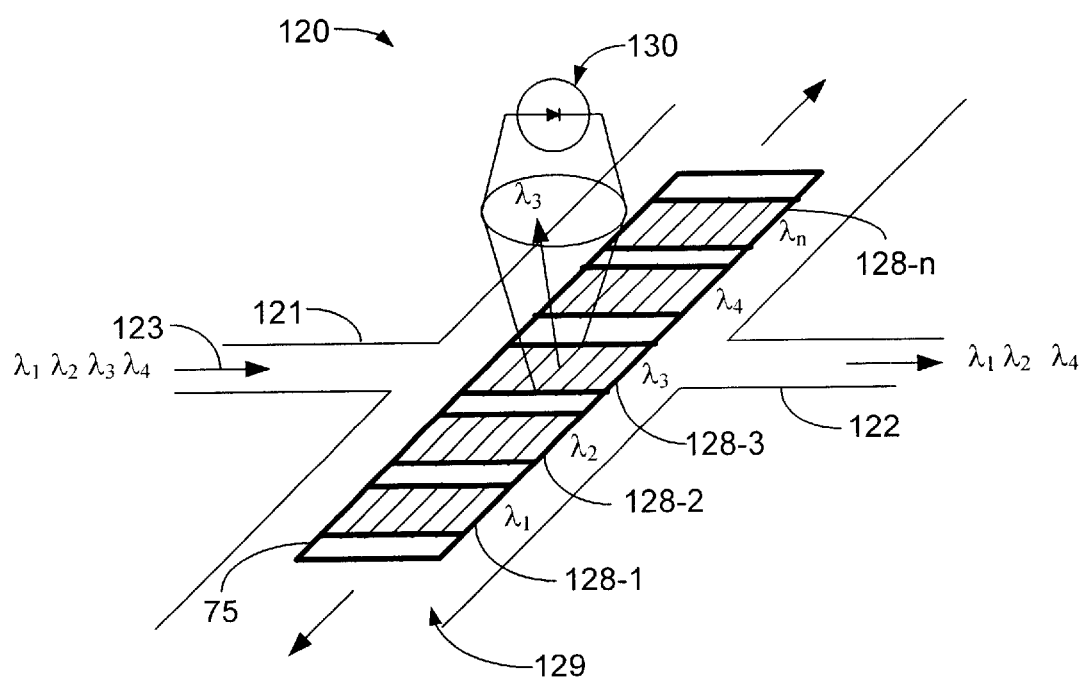
FIG. 10 is a perspective view illustrating the optical switch point of FIG. 9.

FIG. 10 is a perspective view illustrating the optical switch point 120 of FIG. 9. As an example of a use of the optical signal containing the frequency $\lambda_3$ of FIG. 9, optical switch point 120 includes photodiode 130. The optical signal of frequency $\lambda_3$, after being reflected from the composite optical signal traveling in waveguide 121 as described above, is directed to photodiode 130 to allow the measurement of the power, or signal strength, of the optical signal traveling in waveguide portion 121. As mentioned above, the light can be further transmitted or converted to an electrical signal via photodiode 130 for further electronic processing of the information contained therein. It should be noted that the waveguide grating couplers 128-1 through 128-n can also be fabricated using a Bragg filter as known in the art. If a Bragg filter is used, light is not reflected out of the waveguide but reflected back toward waveguide 121.

In such a case, an additional optical element, such as an optical circulator, can be used to extract the signal. Waveguide grating couplers (such as illustrated in FIG. 9) and Bragg filters are well known by those skilled in the art.

The above-described invention makes use of optical MEMS technology. This technology is complex and rather mature. Foundries engaged in the fabrication of optical MEMS can be found at Sandia, and Cronos. As mentioned above, the web site for Sandia's foundry can be found at: http://www.mdl.sandia.gov/scripts/index.asp, and the website for Cronos is located at: http://www.memsrus.com/.

Furthermore, above-mentioned, co-pending, commonly assigned U.S. patent application Ser. No. 08/818,209, describes an electrostatic motor that may be used to provide the above-described translational motion.

The invention disclosed above uses optical MEMS technology, and by making some variations in the process of optical MEMS, either via post processing or changes in the actual process which are compatible with the overall MEMS process, optical waveguides made of polymer and spin on glass, for example, can be constructed. Waveguide grating couplers and Bragg filters can be similarly constructed using holographic techniques or by the interference of two laser beams, all of which are well known in the field of optics. The material used for the waveguides may be glass fiber and/or polymer fiber. It should also be noted that these elements need not be monolithically integrated, but rather, can be separately fabricated and precisely integrated onto the moving elements of the MEMS motors. Both linear and rotary motors have been developed using MEMS technology. It will be apparent to those skilled in the art that many modifications and variations may be made to the preferred embodiments of the present invention, as set forth above, without departing substantially from the principles of the present invention. For example, it is possible to practice the invention using any type of movable optical switching element located at an intersection of two optical paths. Furthermore, while the optical signals described above are described as traveling in particular directions, it is possible for the optical signals to be switched in any direction. All such modifications and variations are intended to be included herein within the scope of the present invention, as defined in the claims that follow.

What is claimed is:

1. An apparatus for directing an optical signal, comprising:
   an optical input path; and
   a micro-machined motor assembly, said assembly comprising a movable optical switching element configured to selectively direct the optical signal from said optical input path to one of at least two optical output paths, a turntable for rotating the movable optical switching element about an axis, and a motor for providing the rotational force to the turntable.

2. The apparatus of claim 1, wherein said movable optical switching element includes a waveguide segment defining at least one optical path between said optical input path and said one of said two optical output paths.

3. The apparatus of claim 1, wherein said optical input path is disposed approximately 90 degrees with respect to said one of said at least two optical output paths.

4. The apparatus of claim 1, wherein said optical input path is disposed less that 90 degrees with respect to said one of said at least two optical output paths.

5. The apparatus of claim 1, wherein said optical input path is disposed greater than 90 degrees with respect to said one of said at least two optical output paths.

6. The apparatus of claim 1, wherein said movable optical switching element includes a plurality of waveguide segments defining a plurality of optical paths between said optical input path and said at least two optical output paths.

7. The apparatus of claim 1, wherein said movable optical switching element includes a mirror.

8. The apparatus of claim 7, wherein said mirror is flat.

9. The apparatus of claim 7, wherein said mirror is curved.

10. The apparatus of claim 1, wherein said movable optical switching element includes waveguide grating couplers configured to direct one of a plurality of optical wavelengths traveling in said optical input path to a different one of said at least two optical output paths.

11. The apparatus of claim 10, further including a photodetector in said one of at least two optical output paths.

12. The apparatus of claim 1, wherein said motor is an electrostatic motor.

13. The apparatus of claim 1, wherein said micro-machined motor assembly is constructed using optical micro electro-mechanical systems (MEMS) technology.

14. The apparatus of claim 1, wherein said micro-machined motor assembly is fabricated using a self-assembly technique.

* * * * *